UNITED STATES PATENT OFFICE.

JOSEPH KOETSCHET, OF ST. FONS, NEAR LYONS, FRANCE, ASSIGNOR TO SOCIÉTÉ CHIMIQUE DES USINES DU RHÔNE, ANCIENNEMENT GILLIARD, P. MONNET ET CARTIER, OF LYONS, FRANCE, A CORPORATION OF FRANCE.

GREEN DYE AND PROCESS OF MAKING SAME.

SPECIFICATION forming part of Letters Patent No. 709,160, dated September 16, 1902.

Application filed June 18, 1901. Serial No. 65,050. (No specimens.)

*To all whom it may concern:*

Be it known that I, JOSEPH KOETSCHET, chemist at the works of Société Chimique des Usines du Rhône, anciennement Gilliard, P. Monnet et Cartier, of St. Fons, near Lyons, France, have invented certain new and useful Improvements in the Manufacture of Coloring-Matters from Sulfonated Aldehydes, of which the following is a specification.

The present invention relates to the manufacture of coloring-matters from ortho-sulfonated derivatives of toluylic aldehyde.

When benzoic aldehyde is treated with sulfuric acid, it is transformed substantially into the meta-sulfonic acid of benzoic aldehyde, and it has been impossible to manufacture by direct sulfonation the ortho derivative, which possesses very valuable properties, particularly the property of yielding coloring-matters very fast to alkalies on condensation with aromatic amins.

I have, as described in another application for patent by me—namely, Serial No. 65,049, filed June 18, 1901—discovered that meta-toluylic aldehyde behaves toward sulfonating agents differently to benzoic aldehyde and that ortho-sulfonated derivatives of meta-toluylic aldehyde may be readily obtained by direct sulfonation. I have further discovered that the sulfonated meta-toluylic aldehyde thus obtained possesses analogous properties to ortho-sulfo-benzoic aldehyde, notably in yielding with aromatic amins—such, for example, as dimethyl anilin, diethyl anilin, and ethyl-benzyl-anilin, methyl-toluidin, ethyl toluidin, or their substitution derivatives—such, for example, as ethyl-benzyl-anilin sulfonic acid, dibenzyl sulfonic acid, toluidin para-sulfonic acid, and naphtylamin sulfonic acid, the leuco bases of bluish-green coloring-matters of great value, being dyestuffs fast to alkalies.

The sulfonation of meta toluylic aldehyde to produce the sulfonated aldehyde, which it is intended to condense with aromatic amins to form coloring-matters of the kind above referred to, may conveniently be carried out according to the following example, in which sulfuric acid containing sixty per cent. anhydrid is employed as sulfonating agent at a low temperature, under which conditions the ortho-mono-sulfonic acid is the main product. It will, however, be understood that any other suitable means of sulfonating may be employed and that the temperature and other conditions mentioned in the example may be varied.

*Example of the preparation of sulfonated metatoluyl aldehyde.*—One part, by weight, of meta toluylic aldehyde is run slowly into ten parts, by weight, of sulfuric acid containing sixty per cent. anhydrid previously cooled to 0° centigrade. The temperature of the mixture is maintained between 0° centigrade and 5° centigrade during the mixing, and the mixture is then allowed to stand several hours to allow the reaction to be completed, the temperature finally rising to about 20° or 25° centigrade, or the temperature may be kept between 0° and 5° centigrade until the complete solubility of a test in water shows the reaction to be completed. The product of the reaction is then poured upon ice, when an aqueous solution is obtained. The excess of sulfuric acid may be removed and the sulfonated meta toluylic aldehyde obtained in the form of its barium salt by neutralization of the solution with carbonate of barium. After filtering off the barium sulfate formed by the excess of sulfuric acid the barium salt of the sulfonated meta-toluyl aldehyde may be isolated by evaporation of the filtrate and purified by recrystallization of the barium salt, which is a white powder easily soluble in hot water, less soluble in cold water, and crystallizes in needles. The solution of this salt gives with phenyl hydrazin a precipitate characteristic of aldehydes. From the barium salt other salts or free sulfonic acid may be prepared.

I do not in the present application for patent make any claim to the production of sulfonated meta-toluylic aldehyde, as this forms the subject of the separate application for patent hereinbefore mentioned.

According to the present invention I condense the new sulfonated meta-toluylic aldehyde above referred to with aromatic amins or their sulfo-acids in the proportion of one molecule of the aldehyde to two molecules of the amin or sulfo-acid, or it may be one molecule of the aldehyde to one molecule each of an aromatic amin and a sulfo-acid of an aromatic amin, and I thus obtain the leuco bases of valuble new coloring-matters of bluish-green shades fast to alkali. These coloring-matters possess the composition $C_7H_6(SO_3H)COH(X)_2$, X indicating an aromatic amin radical. As examples of the aromatic amins which can be so condensed with the new sulfonated aldehyde are dimethyl anilin, diethyl anilin, ethyl benzyl anilin, methyl-toluidin, ethyl-toluidin, and their substitution derivatives—such, for example, as ethyl-benzyl-anilin sulfonic acid, dibenzyl sulfonic acid, toluidin-p-sulfonic acid, naphtylamin sulfonic acid.

In order to effect the condensation of the new sulfonated toluylic aldehyde with the aromatic amin, any ordinary method may be followed which is usually employed in condensing similar compounds; but I will proceed to give the following examples of the condensation of the new sulfonated aldehyde with dimethyl anilin, which will serve, by way of example, to illustrate the invention: Twenty kilos ortho-sulfo-toluylic aldehyde, twenty-five kilos dimethylanilin, and three kilos concentrated sulfuric acid dissolved in one hundred and fifty liters of water is boiled for twelve to fifteen hours, the solution then diluted to five thousand liters and oxidized with peroxid of lead or other suitable oxidizing agent. From the oxidized solution the lead is precipitated with sulfate of sodium filtered, the solution made alkaline with ammonia and evaporated to dryness.

Instead of condensing one molecular proportion of ortho-sulfo-toluylic aldehyde with two molecular proportions of dimethyl-anilin I may substitute either two molecular proportions of another amin or its sulfo-acid or I may employ one molecular proportion of dimethyl-anilin or another aromatic amin and one molecular proportion of the sulfo-acid of an aromatic amin—as, for example, I may heat together twenty kilos ortho-sulfo-toluylic aldehyde, twelve kilos dimethyl anilin, twenty-eight kilos ethyl-benzyl-anilin sulfonic acid, three kilos concentrated sulfuric acid dissolved in one hundred and fifty liters water— and proceed as above, or in place of dilute sulfuric acid I may employ hydrochloric acid or zinc chlorid as condensing agent.

What I claim, and desire to secure by Letters Patent, is—

1. The manufacture of a coloring-matter by condensing ortho-sulfo-meta-toluylic aldehyde with an aromatic amin and oxidizing the leuco product.

2. The manufacture of a coloring-matter by condensing ortho-sulfo-meta-toluylic aldehyde with a substituted aromatic amin and oxidizing the leuco product.

3. The manufacture of a coloring-matter by condensing ortho-sulfo-meta-toluylic aldehyde with an alkylated aromatic amin and oxidizing the leuco product.

4. The manufacture of a coloring-matter by condensing ortho-sulfo-meta-toluylic aldehyde with a dimethylated aromatic amin and oxidizing the leuco product.

5. The manufacture of a coloring-matter by condensing ortho-sulfo-meta-toluylic aldehyde with dimethyl anilin and oxidizing the leuco product.

6. As a new product, a coloring-matter being the oxidized leuco condensation product of one molecule of ortho-sulfo-meta-toluylic aldehyde and two molecules of aromatic amin, and having the composition $C_7H_6(SO_3H)COH(X)_2$, where X indicates an aromatic amin radical, and which coloring-matter is soluble in water and dyes wool and silk bright-green to greenish-blue shades fast to alkalies.

7. As a new product, a coloring-matter being the oxidized leuco condensation product of one molecule of ortho-sulfo-meta-toluylic aldehyde and two molecules of a substituted aromatic amin, and having the composition $C_7H_6(SO_3H)COH(X)_2$ where X indicates a substituted aromatic amin radical, and which coloring-matter is soluble in water and dyes wool and silk bright-green to greenish-blue shades fast to alkalies.

In witness whereof I have hereunto signed my name in the presence of two subscribing witnesses.

JOSEPH KOETSCHET.

Witnesses:
WILHELM ROTH,
MARIN VACHON.